F. SKERL.
TICKET ISSUING MACHINE.
APPLICATION FILED MAR. 23, 1916.
1,287,122.
Patented Dec. 10, 1918.
7 SHEETS—SHEET 2.
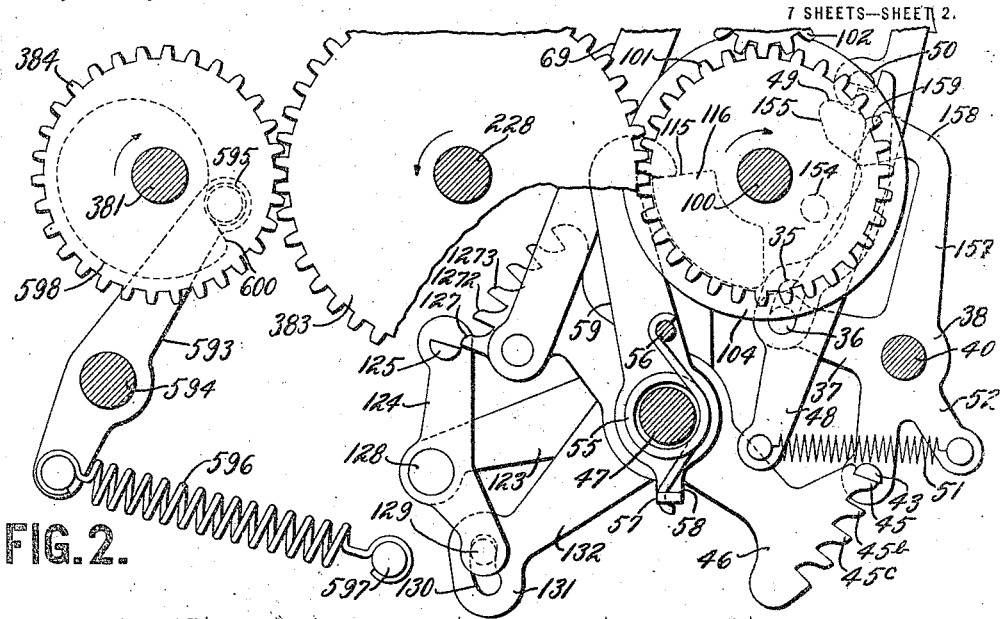
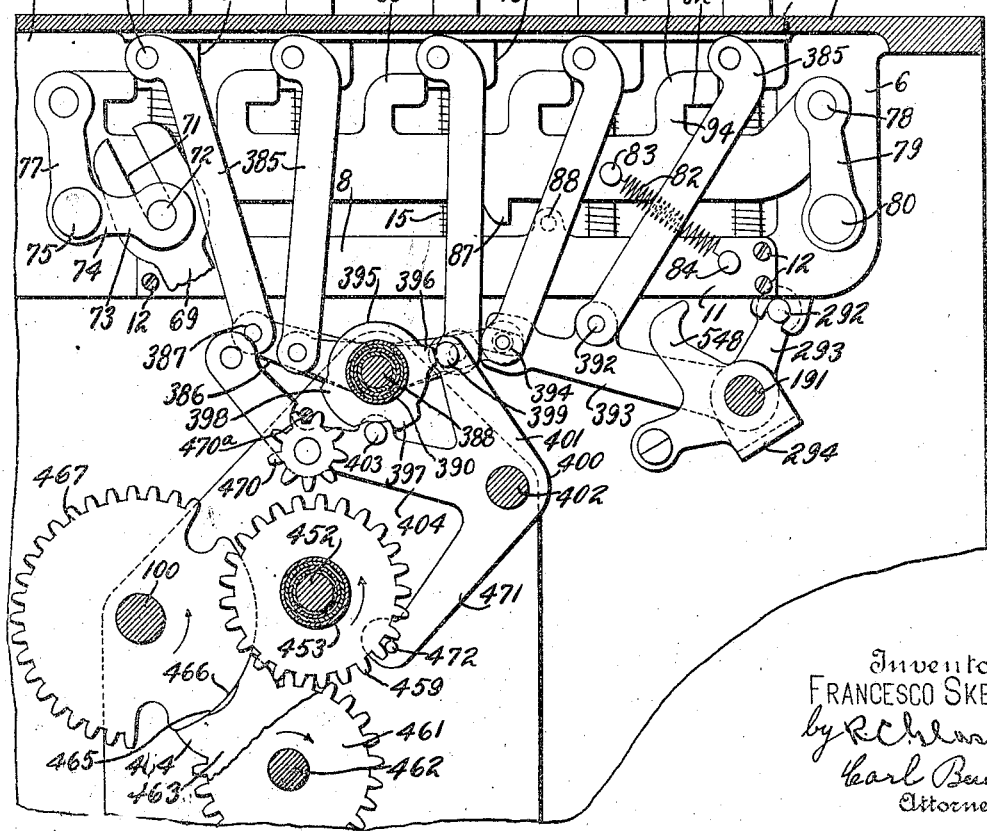
Inventor
FRANCESCO SKERL

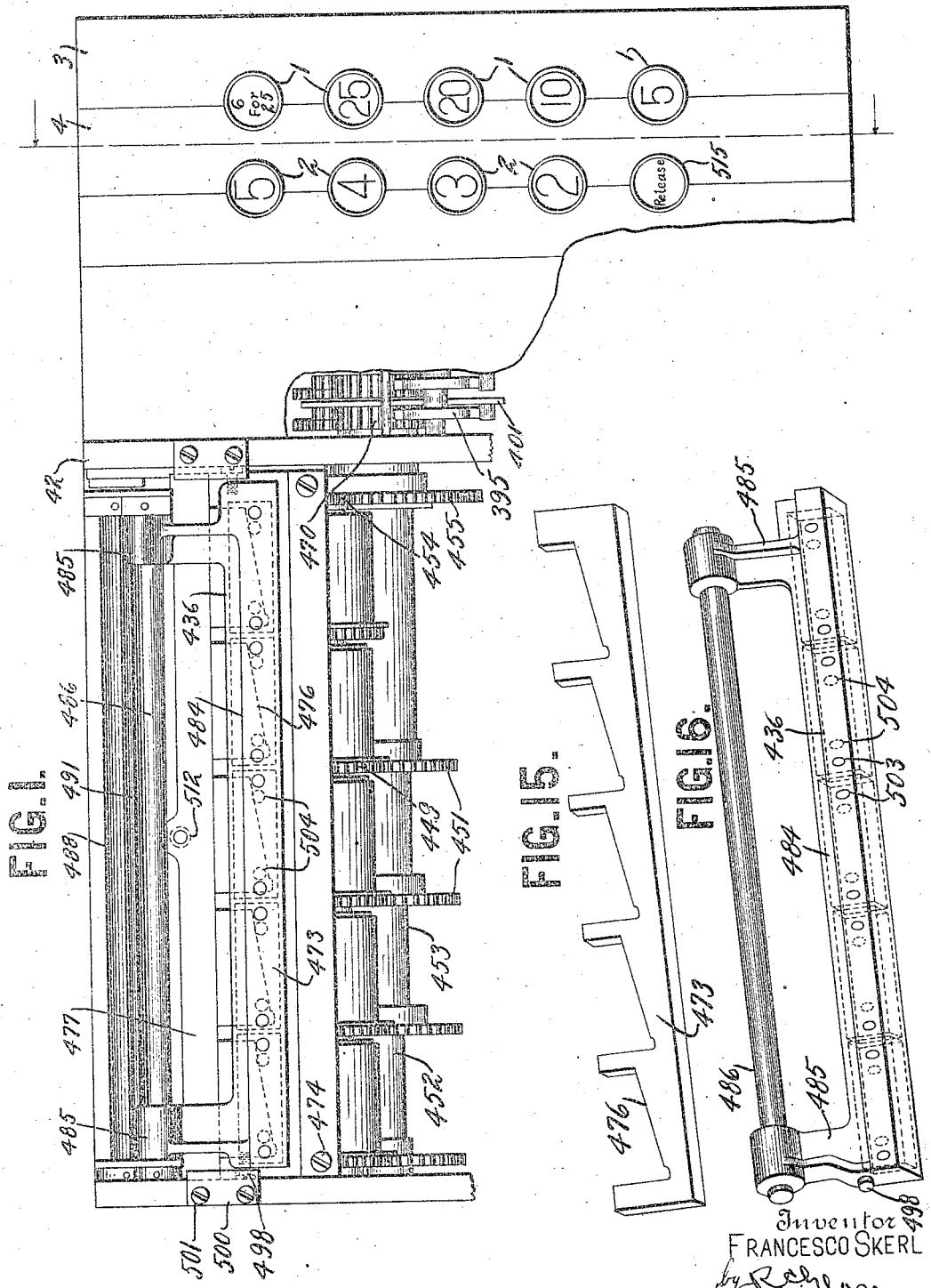

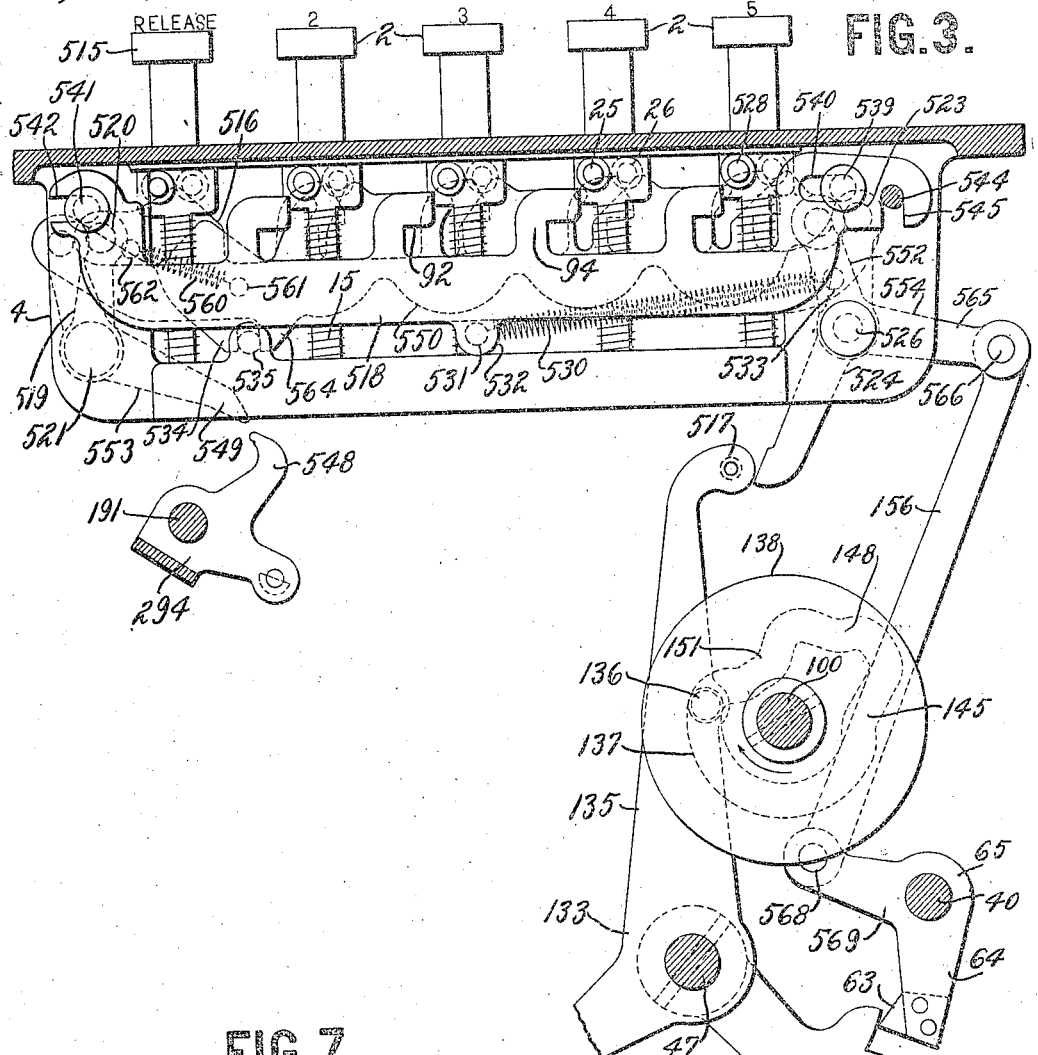
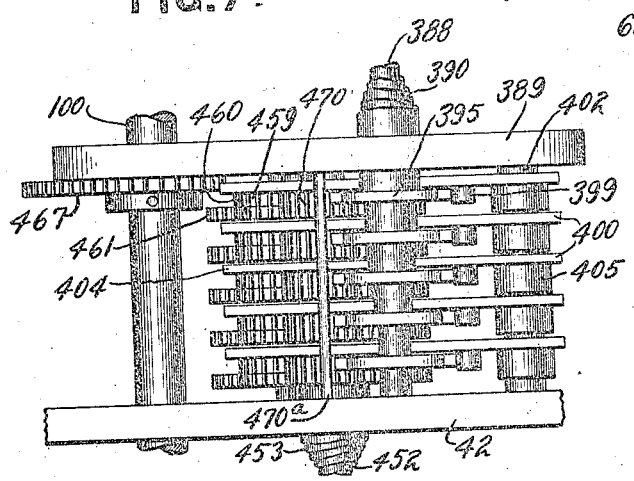

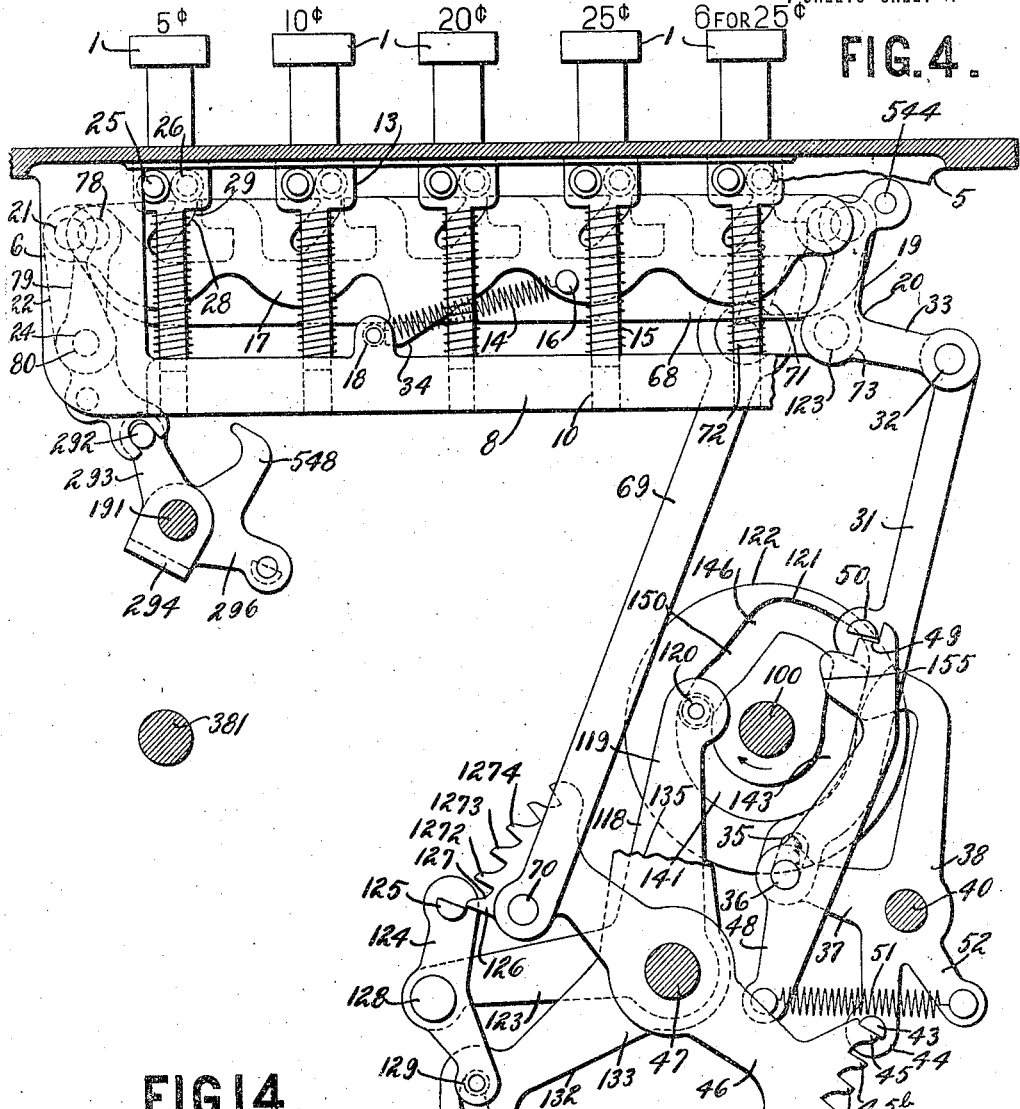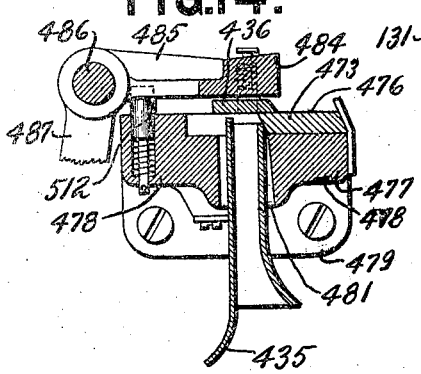

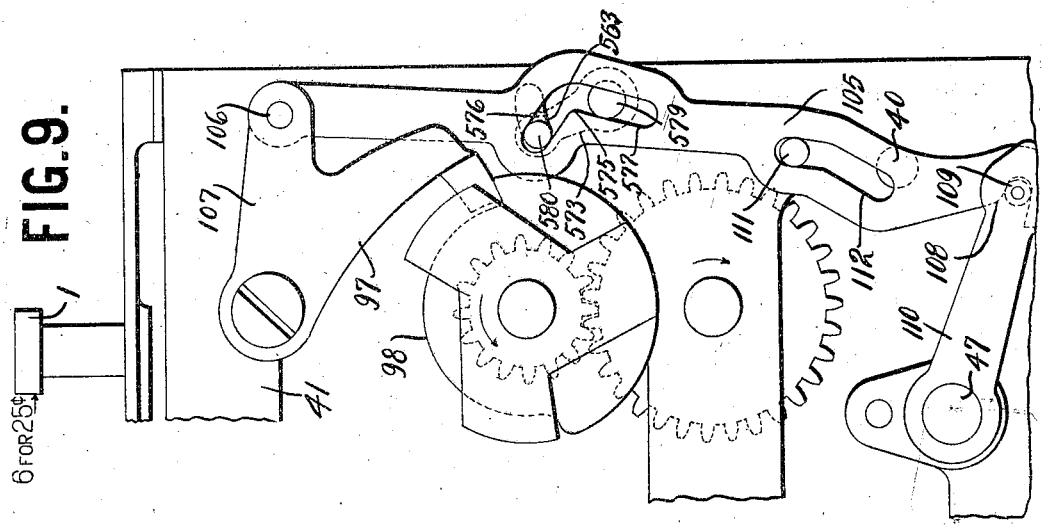
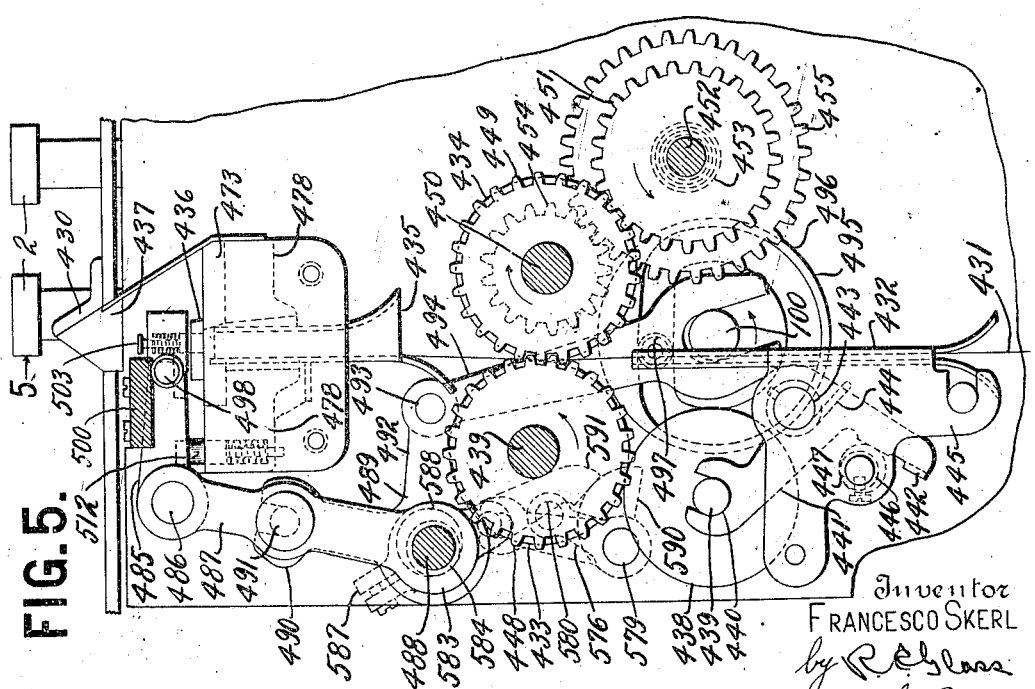

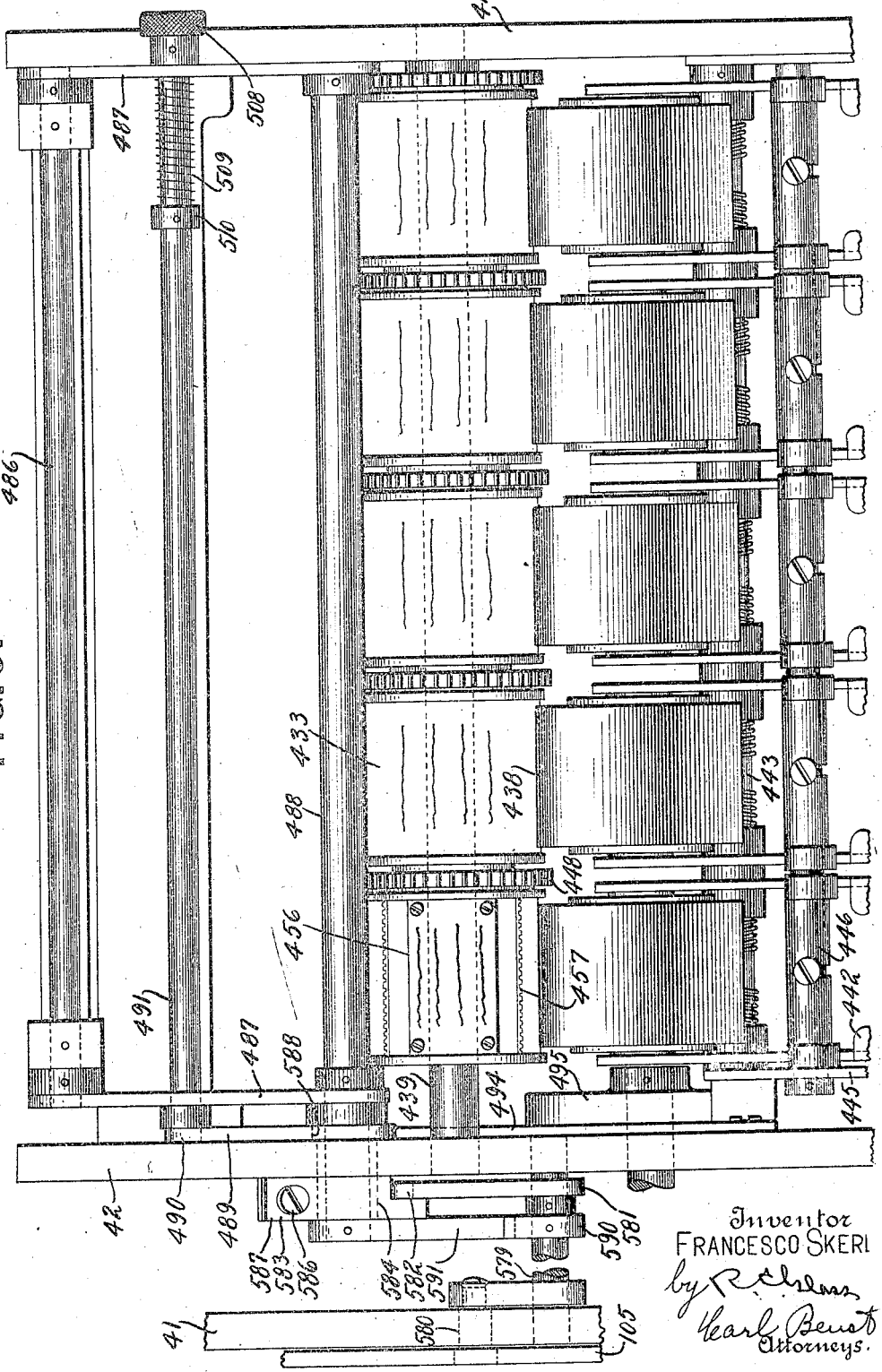

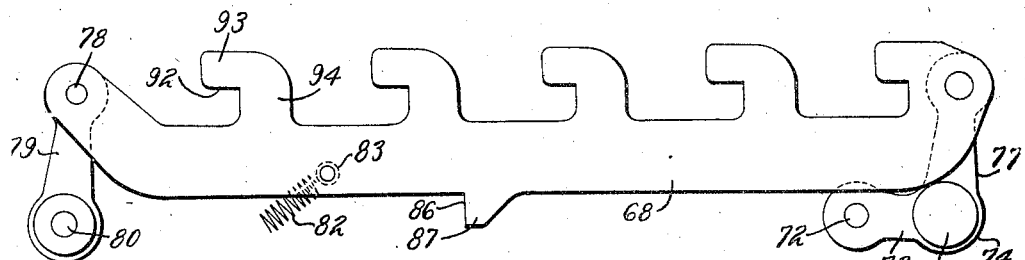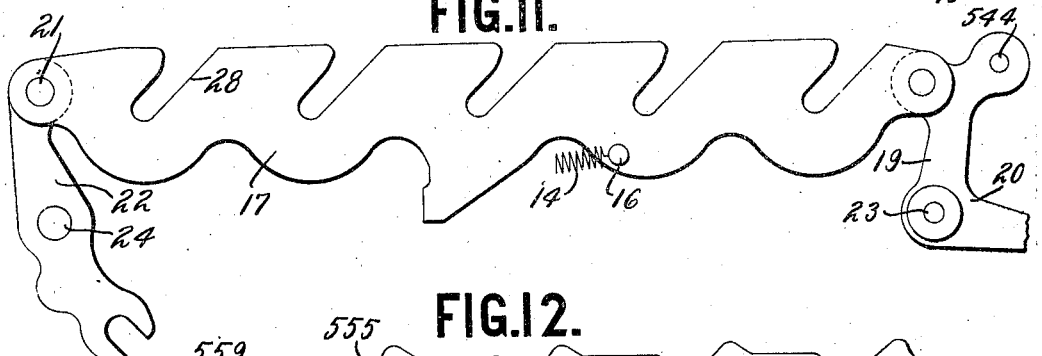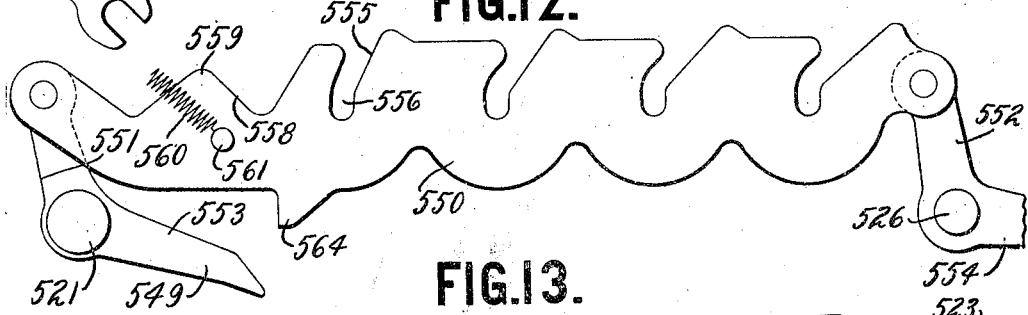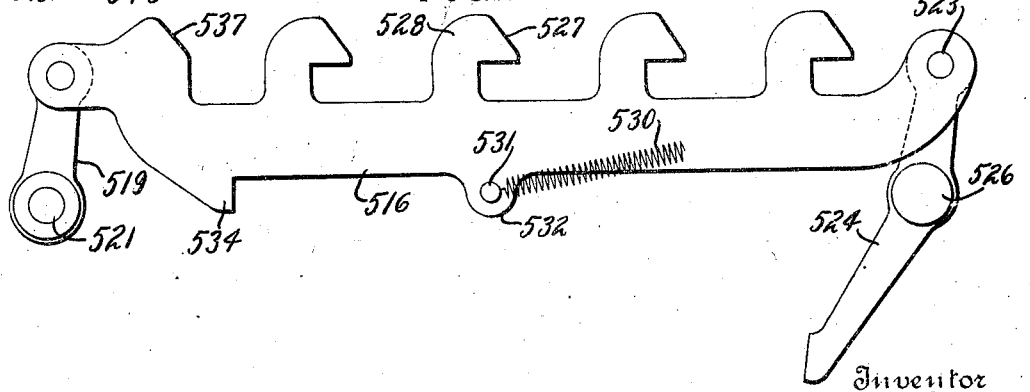

UNITED STATES PATENT OFFICE.

FRANCESCO SKERL, OF DAYTON, OHIO, ASSIGNOR TO THE NATIONAL CASH REGISTER COMPANY, OF DAYTON, OHIO.

TICKET-ISSUING MACHINE.

1,287,122.　　　　Specification of Letters Patent.　　Patented Dec. 10, 1918.

Original application filed November 20, 1913, Serial No. 802,101. Divided and this application filed March 23, 1916. Serial No. 86,123.

*To all whom it may concern:*

Be it known that I, FRANCESCO SKERL, a citizen of Austria, residing at Dayton, in the county of Montgomery and State of Ohio, have invented certain new and useful Improvements in Ticket-Issuing Machines, of which I declare the following to be a full, clear, and exact description.

This invention relates to ticket issuing machines and more particularly to that class adapted to issue one or more tickets of various denominations at one operation of the machine.

All of the patentable subject matter disclosed in this application is not claimed herein, this application being a division of an application for United States Letters Patent filed November 20, 1913, Serial No. 802,101.

An object of the invention is to provide a novel device for partially severing the ticket strip between the tickets as they are issued at a single operation of the machine and completely severing the last ticket from the strip. By the employment of such a device the purchaser can easily withdraw his tickets attached to one another from the machine, still enabling the purchaser or ticket taker to readily and nearly detach the tickets from one another.

With this and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a top plan view of a machine constructed in accordance with the invention shown herein, with the cabinet removed to expose the mechanism of the machine to view.

Fig. 2 is a partial transverse vertical section taken just within the right hand end of the machine looking to the left and showing the machine locking mechanism controlled by the keys in the amount or denomination bank shown in Fig. 4, and also showing the main driving connections.

Fig. 3 is a transverse vertical section taken along the line 3—3 of Fig. 1, looking in the direction of the arrows, with some of the mechanism removed to show more clearly the device controlling the number of tickets to be issued by the machine.

Fig. 4, like Fig. 2, is also a transverse vertical section taken just within the right hand side frame of the machine, with the driving connections, and also the mechanism controlling the differential position of the actuators for the totalizers shown in Fig. 2 removed.

Fig. 5 is a left hand side elevation of the machine with the left hand side frame for the machine removed to expose the ticket printing and issuing mechanisms more clearly to view.

Fig. 6 is a detail view of the bank of amount or denomination keys and the mechanism controlled thereby for selectively connecting the desired ticket issuing device to the main operating mechanism.

Fig. 7 is a top plan view of the selecting mechanism shown in Fig. 6.

Fig. 8 is a rear elevation of the printing and issuing mechanisms shown in Fig. 7.

Fig. 9 is a detail view of parts of the motor clutch and the connections from the motor locking arm to the differential mechanism controlling the variable operation of the motor.

Figs. 10 and 11 respectively are detail views of a detent and plate employed to lock the amount or denomination keys in depressed positions, and to disable a device normally locking the machine against operation.

Figs. 12 and 13 respectively are detail views of a plate and detent employed to determine the number of tickets to be issued at each operation of the machine and to temporarily retain the depressed number key in depressed position until the beginning of the operation of the operating mechanism.

Fig. 14 is a detail view showing the severing knife edges for the tickets and their respective supporting frames in cross section.

Figs. 15 and 16 respectively are perspective views of the stationary knife edges and of the movable knife edges carried by their supporting bar.

The specific embodiment of the invention shown in the drawings is illustrative only as the invention is equally applicable to other types of accounting machines. The invention as shown in the preferred form is applied to a ticket machine intended when in use to be suitably placed so that the tickets issued will be accessible to the customers while not to the operator of the machine, thus bringing about a condition which would make noticeable attempts to defraud by reselling used tickets.

For instance, the machine may be placed in the window of a ticket office so that the tickets as they pass through the top of the cabinet near the rear of the machine will extend through a hole or slot in the window of the ticket office so that only the purchaser can remove the tickets, a hood or chute being provided on the cabinet to prevent the operator from reaching the tickets by means of his finger or any instrument inserted between the opening in the cabinet and the hole in the window.

The machine is designed to issue tickets through the top of the cabinet instead of through the rear, as in some businesses, such as circuses and side shows, tickets are sold from high platforms and it is necessary for the ticket sellers to remove the tickets from the machine and hand them to the customer and conditions may also exist in other businesses in which it is desirable for the operator to handle the tickets in which cases the machine is positioned so that the operator has access to the tickets as they are issued.

The machine is equipped with a key for each denomination in which the tickets are issued and these keys which are arranged in a bank or series will be referred to herein as "amount" or "denomination" keys. To operate the machine when only one ticket is desired, the operator need only press the proper amount key, the machine then automatically printing and issuing the ticket of the desired denomination.

There is an additional bank or series of keys, one for each number of tickets that the machine is designed to issue at one operation of the latter, and the keys in this bank will be called the "ticket" or "number" keys.

Depression of a number key in the preferred form permits actuation of a detent plate for temporarily retaining the key in depressed position and also moves a reciprocating plate differentially. This latter plate is connected to a lever carrying a stop the extent of differential movement of which determines the extent of movement of a spring actuated member. The amount key representing the value of the tickets to be issued is then operated and such operation actuates a plate to an invariable extent and permits actuation of detents for locking the depressed keys in both the amount and number banks in depressed position until near the end of the operation of the machine. The plate moved an invariable extent by the amount keys is normally connected to the above mentioned spring actuated member and prevents movement of the member, and movement of this plate by the key disables such connections so that the spring actuated member is rocked into engagement with the previously positioned stop.

An arm for normally locking the machine against operation is connected to this spring actuated member and movement of this latter member as just mentioned moves the locking arm differentially out of locking position.

When the amount key has been depressed the crank handle, if the machine is to be so operated, is turned and the operating mechanism given a number of cycles of movement depending on the number of tickets to be issued. If the motor is employed to drive the operating mechanism, the locking lever for the clutch connections of the motor, also being moved by the spring actuated member, will control the extent of operation of the motor and thus determines the number of cycles of movement of the operating mechanism. Upon each cycle of movement of the operating mechanism a ticket is fed, printed and severed by a ticket issuing device and the locking arm is returned one step toward its locking position. When the last ticket has been issued the locking members are rendered effective to prevent an operation of the machine until an amount key is again operated at the next operation of the machine.

The machine in the preferred form of embodiment is designed to print tickets of four different denominations, namely, 5¢, 10¢, 20¢ and 25¢ tickets and also six 5¢ tickets for a quarter. It is of course to be understood that a machine can be constructed in accordance to the present invention to issue tickets of any denominations, the denominations of the tickets shown in the drawings being merely used for illustrative purposes. A separate printing and issuing mechanism for each denomination as well as for the "six for a quarter" tickets is provided, as it is desired that the machine issue different colored tickets. Each of these printing devices is normally disconnected from the main operating mechanism, but each amount key is connected to a device for connecting only the printing mechanism corresponding to the key depressed with the main operating mechanism. Upon each cycle of movement of the main operating mechanism one ticket of the desired denomination when a 5¢, 10¢, 20¢, or 25¢ ticket is desired, is issued by its respective printing and issuing mechanism. Six 5¢ tickets for a quarter, however, are issued by the corresponding printing device at a single cycle of movement of the main operating mechanism.

Amount keys.

The above description briefly points out the general features of the machine constructed in accordance with the invention. The details appear in the drawings in which 1 represents the amount or denomination keys for determining the denomination of the ticket or tickets to be issued and 2 represents the number keys which determine the number of tickets to be issued. As shown in Fig. 1, these keys are arranged in two rows or banks at the right hand side of the machine and the bank of amount keys is to the right of the number keys. As the machine is designed to issue but one ticket upon operation of an amount key when no number key is operated, the various mechanisms of the machine and their operation when only an amount key is operated will be first described and then the devices controlled and operated by the number keys for causing a variable duration of operations of these mechanisms when a number key as well as an amount key is operated will be taken up in detail.

The amount keys are slidably mounted in ways or notches cut in the left hand edge of a plate 3 which extends across the top of the right hand side of the machine. The right hand edge of a plate 4, which is constructed similarly to the plate 3, contacts with the left hand edge of this latter plate to retain the keys in their ways or notches. The plate 3 and arms 5 and 6 (Fig. 2) projecting downwardly from the lower surface of the plate near its rearward and forward ends respectively and connected at their lower ends by a bar 8. The horizontal bar 8 of this frame on its left hand side is provided with vertically extending slide ways or guides 10 (Fig. 4) which guide the lower ends of the amount keys in their vertical movements. A plate 11 (Fig. 6) is fastened by screws 12 to the left hand side of the bar 8 to prevent displacement of the lower ends of the keys. The keys are equipped with shoulders 13 which normally engage the under surface of the plate 3 to limit outward movement of the keys 1. Springs 15 coiled about the shanks of the keys and under compression between the bar 8 of the key frame and the shoulders 13 of the keys serve to retain the keys in their normal undepressed positions and also serve to return the keys to these positions upon being released near the end of the operation of the machine.

Machine and key locking mechanism.

A complete depression of an amount key releases a motor locking lever to permit the motor to operate the machine. It also causes movement of a detent for locking the depressed key in its operated position and for preventing an operation of the other keys in the bank during an operation of the machine. The mechanism by which these results are accomplished will now be described.

A movable plate 17, shown in detail in Fig. 11 and in assembled position in Fig. 5 is pivotally connected at its rear end to the vertically extending arm 19 of a bell crank lever 20. The opposite end of the plate 17 is connected at 21 to the upper end of a lever 22. As shown in Fig. 5 the bell crank lever 20 is pivoted by a pin 23 to the left hand side of the arm 5 of the key frame. The lever 22 is pivoted at 24 to the other arm 6 of the key frame. Each key is provided with two pins 25 and 26, the pins 25 of the amount keys, however, being provided for a purpose not involved in the subject matter of this divisional application. These pins 26 are shown in dotted lines in Figs. 2 and 4. Each projects to the left near the rear of the shoulder 13 on its respective key and the pins 25 project to the right near the front of the shoulders so that the axes of the pins are in different vertical planes. When a key is depressed the pin 28 on the left of the key engages an inclined edge 28 of a notch 29 in the plate 17 and as the respective notches 29 under the pins 26 on the keys are similarly constructed and inclined inwardly and downwardly, the depression of any one of the amount keys moves the plate 17 forwardly swinging the levers 20 and 22 about their pivots. The plate 17 is moved against the tension of a spring 14 connected at 16 to the plate and at the opposite end to a stud 18 projecting from the horizontal bar 8 of the key frame. The engagement of a downwardly extending projection 34 on the lower edge of the plate with the stud 18 prevents the spring 14 from pulling the plate past normal position. The lower end of the lever 22 carrying one end of the movable plate 17, which is actuated by the amount keys, is bifurcated at its lower end and straddles a pin 292 (Fig. 4) projecting from one arm 293 in a yoke 294 which is loosely mounted on the shaft 191 extending between the left hand side frame and the central frame 42 of the machine.

Movement of the plate 17 in the manner just described effects the unlocking of the machine through the following described mechanism; A link 31 (Figs. 2 and 4) is pivoted at 32 to the outer end of the horizontally extending arm 33 of the bell crank lever 20 and at its lower end the link has a slot 35 surrounding a pin 36 on an arm 37. The arm 37 is part of a multi-armed member 38 loosely mounted on a rod 40, carried by the right hand side frame 41 (Fig. 9)

and a central supporting frame 42 (Fig. 1), which comprises a solid plate mounted on the base of the machine. The plane face of a lug 43, which projects from the free end of a downwardly projecting arm 44 of the member 38 is normally in engagement with the upper plane face of the uppermost of a series of projections 45 on the rear end of a lever 46 fast to a shaft 47 supported by suitable bearings in the frames of the machine. An arm or lever 48 is pivoted on the arm 37 by a pin 36 and at its upper end has two shoulders 49, the upper one of which is normally held under the plane face of a stud 50 projecting laterally from the central portion of the link 31, by the spring 51, which is under tension between the lower end of the arm 48 and an arm 52 of the multi-armed member 38.

When one of the amount keys 1 is depressed the plate 17 as described is moved forwardly, rocking the bell crank lever 20 about its pivotal center 23. Such movement of the bell crank lever 20 through the link 31 and the arm 48 forming a positive connection between the link 31 and the multi-armed member 38, rocks the member 38 counter clockwise as viewed in Figs. 2 and 4 to carry the lug 43 out of engagement with the uppermost of the projections 45 on the rear end of the lever 46. The lever 46 is then rocked counter-clockwise by a spring 55 (Fig. 2) coiled about the shaft 47, one end being bent around a stud 56 on frame 42, the other end bent about a lug 57 formed on a locking arm 59 also rigidly mounted on the shaft 47.

A stepped member 61 (Fig. 3) is also rigidly mounted on the shaft 47. The construction of this stepped member will be more fully described hereinafter and it will be sufficient to say here that the uppermost stop or step 62 is normally one step of movement of the member 61 from a plate 63, rigidly fastened to the lower end of a downwardly extending arm 64 of a bell crank lever 65, pivoted on the rod 40 and adapted to be differentially adjusted by the number keys 2 in a manner to be described later.

When but one ticket is to be issued lever 65 is not moved from normal position as no number key is operated. When an amount key is operated and the lug 43 (Figs. 2 and 4) is taken out of engagement with the upper face of the uppermost projection 45 on the rear end of the lever 46, the spring 55 will rock the shaft 47, the stepped plate or member 61, and the lever 46 rigid with the shaft 47 one step in a counter clockwise direction. This one step of movement is limited by the engagement of the first step 62 of the stepped member 61 with the plate 63 on the bell crank lever 65.

Movement of the lever 46 from normal position in the manner just described permits movement of a locking detent 68 (Figs. 4, 6 and 10) to lock the depressed amount key in operated position until near the end of the operation of the machine and also to lock the undepressed amount keys against operation.

The means by which this is accomplished is best shown in Fig. 4. A link 69 pivoted at 70 to the forward end of the lever 46, (Figs. 4 and 6) is bifurcated at 71 to straddle a pin 72 on a forwardly extending arm 73 of a bell crank lever 74 pivoted at 75 to the amount bank key frame. The upwardly extending arm 77 (Figs. 6 and 10) of bell crank lever 74 pivotally supports the rear end of the locking detent 68. The forward end of the detent 68 is pivoted at 78 to an arm 79 pivoted at 80 to the arm 6 of the amount key frame. A spring 82 (Figs. 6 and 10), connected at one end to a pin 83 on the detent and to a pin 84 on the key frame, tends to draw the plate forwardly. Such movement of the detent is prevented by the link 69, which, when the lever 46 is in its normal position, holds the bell crank lever 74 and therefore the detent 68 against forward movement. When, however, an amount key is operated and the lever 46 is rocked counter-clockwise by the spring 55 the link 69 is carried downward out of engagement with the pin 72 to permit the spring 82 to draw the detent 68 forward until such movement is limited by the engagement of a projection 87 on the lower edge of the detent with a pin 88 on the bar 8. Upon movement of the detent 68 the lower edge 92 of the horizontal portion 93 of one of the projections 94 on the detent passes over the pin 26 of its respective key, if the key is operated, to retain the key in depressed position and the upper edges of the horizontal portions 93 of the other projections 94 pass below the pins 26 of their respective undepressed keys to prevent the operation of these keys during the operation of the machine.

Only part of the clutch connections for the electric motor are shown in the drawings (Fig. 9), it being considered sufficient to state in this application that the motor locking arm 97 normally engages a clutch member 98 and that movement of the arm from locking engagement permits operation of the clutch member and causes simultaneous closing of the motor circuit so that the motor will operate the main drive shaft 100.

The main drive shaft 100 is rotated by the engagement of a gear wheel 101 (Fig. 2) rigidly mounted on it with the gear wheel 102 having one-half as many teeth as the gear wheel 101 and rigidly mounted on the shaft 103, which in turn is driven by the motor clutch. The gear 101 also meshes with an intermediate gear 383 (Fig. 2) loosely mounted on a stud 228 on the right end frame. The gear 383 meshes with a gear 384 fast on a shaft. In this manner the shaft 381 is given one complete rotation upon each rotation of the main drive shaft 100.

To move the locking arm 97 out of engagement with the clutch connections of the motor, a link 105 (Fig. 9) is pivotally connected at 106 to a projection 107 of the arm 97 and at its lower end the link is provided with a notch 108 in which a roller 109 plays. The roller is mounted on the free end of an arm 110 rigid on the end of the shaft 47 on the outside of the side frame 41 of the machine. A stud 111 on the side frame 41 of the machine extends into a slot 112 in the link 105 to guide the link in its movements and thereby prevent the notch 108 becoming disengaged from the roller 109. When the shaft 47 is rocked counter clockwise upon depression of an amount key, the arm 110 will be given a like movement and through the link 105 raise the motor locking arm 97 out of engagement with the clutch connections to permit an operation of the motor. Another locking arm 59 (Fig. 2) is also provided to prevent an operation of the machine until a key is depressed in case it is desired to operate the machine by a crank instead of by a motor. It is clear that a crank could be readily employed as, for example, by rigidly attaching it to the shaft 103. The upper end of this arm 59 carries a projection 114 and the lower edge of this projection normally engages the upper edge 115 of a block rigidly mounted on a disk 104 rigid on the shaft 100. When the shaft 47 is rocked the projection 114 of the arm 59 is moved out of engagement with the plate 115 and permits rotation of the drive shaft 100 upon which the gear wheel 101 is rigidly mounted.

The depressed key is not released, and the machine locking arm 59 and the motor locking arm 97 are not returned to normal locking position, until near the end of the operation of the machine, but as the operating mechanism effects the release of a depressed key and the restoration of these locking members to normal position through the mechanism just described, this operation of the mechanism may be described here. An arm 119 of a bell crank lever 118 (Fig. 4) carries an anti-friction roller 120 which engages in a cam groove 121 formed in a disk 122 rigidly mounted on the drive shaft 100. The other arm 123 (Figs. 2 and 4) of the lever 118 carries a small lever 124 pivotally mounted on the pin 128. The lever 124 carries a stud 125 which is semi-cylindrical in shape and its plane surface is normally out of the path of movement of, but almost in the same plane as, the lower plane edge 126 of the lowermost of a series of projections or stops 127 on the forward edge of the lever 46 so that when the lever 46 is rocked one step in a counter-clockwise direction and just before movement of the lever 118 is effected, as will be described, the stud 125 will be just one step of movement above the lowermost projection 127. The lower end of the lever 124 carries an anti-friction roller 129 playing in a slot 130 in an enlarged portion 131 formed on the outer end of an arm 132. The arm 132 forms part of a lever 133 which is loosely mounted on the shaft 47. The slot 130 is eccentric with the shaft 47 and the upper end of the slot with which the roller is normally in contact is nearer the shaft than is the lower end of the slot. The upwardly extending arm 135 (Fig. 3) of the lever 133 is equipped with a roller 136 working in a cam groove 137 formed in a disk 138 rigidly mounted on the main drive shaft 100.

The operation of the above described mechanism for returning the machine locking lever 59 and the motor locking arm 97 to normal position and for moving the locking detent 68 out of locking position with the amount keys is as follows: Depression of an amount key as already explained moves the plate 17 rearwardly and because of the engagement of the shoulder 49 with the stud 50 on the link 31 the multi-armed member 38 is rocked counter-clockwise to carry the lug 43 on the arm 44 of the member 38 out of engagement with the uppermost projection 45 on the rear end of the lever 46. The locking arm 59 engaging the plate 116 and the locking arm 97 for the motor, upon movement of the shaft 47, are rocked with the shaft out of locking position and their movement is limited by the engagement of the uppermost stop 62, of the stepped plate 61 rigid on the shaft 47, with the plate 63 on the lever 65 which has not been moved when but one ticket is to be issued.

Simultaneously with the releasing of the machine the motor circuit is closed and the main drive shaft 100 is given one complete rotation in a clockwise direction; but one rotation being required for a complete operation of the machine when but one ticket is to be issued. During approximately the first half of rotation of the drive shaft 100 the bell crank lever 118 carrying the centrally pivoted lever 124, and the lever 133 provided with the slot 130 in which the roller 129 on the lever 124 engages, are not moved by their respective cam slots 121 and 137, as the roller 120 on the arm 119 of the lever 118 plays in the concentric portion 141 of its cam groove while the roller 136 on the arm 135 of the lever 133 rides in the concentric portion 142 of its cam groove 137. While the roller 120 is passing into the eccentric portion 143 of its cam groove 121, the lever 118 is rocked counter-clockwise so that the plane surface of the lug 125 on the lever 124 is carried into the same relative position with the lower edge of the lowermost projection 127 on the forward end of the lever 46 that is, when these levers are in normal position and in this position it will be remembered that the plane surface of the stud 125 is slightly lower than the lower edge of the projection 127. During this counter-clockwise movement of the lever 118, the roller 136 on the lever 133 is playing in the eccentric portion 145 of its cam groove 137 and as this portion of the cam 137 is nearly like the eccentric portion 143 of the cam groove 141 the levers 118 and 133 are moved nearly as a unit so that the engagement of the pin 129 on the lower end of the lever 124 with the upper edge of the eccentric slot 130 in the lever 133 is maintained. The roller 120 on the lever 118 then plays in the second concentric portion 146 of its cam groove 121 and the lever 118 is held stationary during this period, but as the roller 136 on the lever 133 is at this time working in the eccentric portion 148 of its groove 137, which rocks the lever 133 clockwise, the lever 133 is given a movement relative to the now stationary lever 118 so that the lower end of the slot 130 is carried up into contact with the pin 129 on the lever 124. As the slot 130 in the lever 133 is eccentric to the shaft 47, the lever 124 is rocked in a clockwise direction and the lug 125 is thereby carried under the projection 127 of the positioned lever 46. When the roller 120 on the lever 118 works in the eccentric portion 150 of its cam groove 121 and the roller 136 works in the eccentric portion 151 of its cam groove 137, the levers 133 and 188 are rocked in a clockwise direction so that the lever 46 and therefore the shaft 47 are rocked to normal position. As the locking arm 59 is fast to the shaft and the motor locking arm 97 is fast to the shaft and the motor locking arm 97 is connected to the shaft 47 by the arm 110 and link 105, they are restored to normal locking position on restoration of the shaft 47 to normal position. Finally the lever 135 is given a reverse movement, that is, in a counter-clockwise direction relative to the lever 118 so that the lever 124 is rocked in a counter-clockwise direction through the slot 130 and pin 129 to carry the lug 125 out of engagement with the lowermost projection 127 on the forward end of the lever 46.

Simultaneously with the rocking of the lever 124 so that the stud 125 is taken out of engagement with the projection 127 on the lever 46 the multi-armed member 38 is restored to normal position so that the lug 43 on the arm 44 of the member 38 is again brought into engagement with the plane surface of the uppermost projection 45 on the rear end of the lever 46 in order to retain the lever 46 in normal position until the next operation of the machine. To accomplish this purpose a stud 154 (Fig. 2) on the disk 104 engages an inclined face 155 on the upper end of the arm 48 and forces the arm rearward so that the upper shoulder 49 of the arm 48 is carried out of engagement with the lug 50 on the link 31. The rocking of the multi-armed member 38 to initial position by the spring 51 is then permitted with the depressed key remaining in operated position as the pin 36 on the arm 37 of the member 38 by reason of the upper shoulder 49 of the arm 48 having been thrown out of engagement with the lug 50 can be moved out of engagement with the lower end of the slot 36 in the link 31 and into engagement with the upper end of the slot. To make such return movement of the member 38 positive the upwardly extending arm 157 of the member 38 is provided with a projection 158 having an inclined edge 159 so that the stud 154 will engage the edge 159 after the upper shoulder 49 of the arm is carried out of engagement with the lug 43 on the member 38 to its locking position over the projection 45 on the lever 46.

The restoration of the lever 46 to normal position in the manner just described raises the link 69 so that the lower end of the notch 71 in the upper end of the link engages the stud 72 in the bell crank lever 74 which supports one end of the locking detent 68 and moves the detent rearward to carry the projections 94 out of the path of movement of the pins 26 on the amount keys to permit the depressed key to be returned to undepressed position by its spring 15 and the detent is held out of locking position by the link 69 and lever 46 until the next operation of the machine.

It will be remembered that in order to permit the rocking of the multi-armed member 38 to initial position with the depressed key remaining in operated position, the upper shoulder 49 of the arm 48 is drawn out of engagement with the lug 50 on the link 31. As the multi-armed member 38 and the arm 48 are brought to initial position, the lower shoulder 49 of the arm 48 will just touch the lug 50 without restoring the link 31 to normal position. The restoration of link 31 to normal or initial position takes place when the amount key is returned to undepressed position. When the bell crank lever 20 is rocked counter-clockwise (Fig. 5) at release of the amount key, it raises the link 31, after which under the action of the spring 51, the upper shoulder 49 will be brought under the lug 50. It will be seen from this that the depressed key must be returned to undepressed position before the machine can again be operated. The mechanism whereby the keys are released so that they may be returned to undepressed position by their springs has already been described.

*Ticket issuing mechanisms.*

As stated above, the machine is adapted to print and issue tickets of the different denominations on different colored ticket strips. For this purpose there are five printing mechanisms each of which prints a different colored ticket from the others. The various printing devices are duplicates of each other with the exception of their electros, which, of course, are different as they print different values. The printing mechanism for the "six for a quarter" tickets is adapted to issue six tickets upon each complete rotation of the main drive shaft 100 so that the construction of its electro and the gearing for operating the feeding means of this printing device are slightly different from those of the other printing devices and these differences will be pointed out in the following description.

A ticket strip, one for each ticket issuing mechanism, is indicated by the character 431, and referring to Fig. 5 it will be seen that this strip is fed from a ticket roll (which is under the machine but not shown in the drawings) upward through a guide 432 between an electro 433 and a platen roll 434 through another guide 435 past the movable severing knife 436 and finally through an opening 437 in the top of the cabinet of the machine. The hood 430 (Fig. 5) on the top of the cabinet and inclined over the opening 437 causes the tickets to pass out through an opening in the glass of the ticket office if the machine is used so that only the purchaser can remove the tickets. Each electro 433 may have any suitable design for printing a design or other matter together with the value of the ticket, the wavy lines shown in the electros in Fig. 8 being used to indicate that the electros have some such design and printed value engraved thereon. An inking roll 438, one for each electro and carried by a rod 439 resting in the recesses 440 at the upper ends of the arms 441 of a yoke 442 pivoted on a rod 443, supported by plates 445 projecting from the guide 432 for the ticket strips, coöperates with the electro to ink the latter. The inking roll is held in engagement with the electro by means of springs 444 (Figs. 5 and 8) coiled about the rod 443. Eccentrics 446 carried by a shaft 447 supported by the plates 445 are employed to control the degree of contact between the electros and the inking rollers.

The electros 433 for the 5¢, 10¢, 20¢ and 25¢ tickets strips are rotated through gears 448 fast thereon and these gears mesh with gears 449 of the same size and fast to the rolls 434 (Fig. 5) loose on a rod 450. These platen rolls 434 and electros 433 also serve as the feeding means for the ticket strip as is also usual in the art. The gear wheels 449 mesh with gear wheels 451 which are of the same size as the gear wheels 449. The left hand gear 451 appropriate to the 5¢ key is fast to the shaft 452 and the remaining ones are each fast to one of a series of sleeves 453. The shaft 452 is supported at its ends by the central frame 42 and the left hand end frame of the machine. A gear wheel 454, rigid with the platen roll 449 for the "six for a quarter" ticket printing device meshes with a gear wheel 455. The gear wheel 454 as shown in Fig. 1 is on the opposite side of the platen from the gear wheel 448 meshing with the gear wheel 449, and the gear wheel 455 has twice as many teeth as the gear wheel 454. The gear wheel 455 is fast to the outermost sleeve 453 and as this sleeve is also given one complete rotation upon each rotation of the main drive shaft 100 when six tickets for a quarter are to be issued, it is clear that the platen 434 and electro 433 for the "six for a quarter" ticket printing device will be given two complete rotations upon each complete rotation of the main drive shaft. Each "six for a quarter" ticket is one third the size of the other tickets and thus three "six for a quarter" tickets are issued by the "six for a quarter" issuing device upon each rotation of the electro 433, there being three similarly engraved plates 456 (Fig. 8) on its electro 433. On the electro 433 for the "six for a quarter" printing device are also three longitudinally extending perforating blades 457 (Fig. 8), these being fixed 120° apart about the periphery of the electro and projecting radially outward. As the electro 433 and the platen 434 are turned these perforating blades will perforate the tickets strip between the tickets as they are issued. The electros for the other printing devices have no perforating blades as the tickets are partially severed from one another as they are issued by the severing mechanism, as will be presently described.

Only the ticket issuing device corresponding to the key depressed is operated upon an operation of the machine and the means for selectively coupling the desired ticket issuing device to the main operation mechanism will now be taken up in detail. Referring to Fig. 6 it will be seen that links 385 are pivoted at their upper ends to their corresponding keys by means of the pins 26. The links for the 10¢, 20¢, 25¢ and "six for a quarter" keys are pivoted at their lower ends to the outer ends of corresponding arms 386 by means of the pins 387. The arm 386 connected to the link 385 for the "six for a quarter" key is fast to a shaft 388 which is journaled at one end in the central frame 42 and passes through an auxiliary frame 389 comprising a vertical plate mounted on the base of the machine between the central frame 42 and the left hand end frame of the machine, and the other end of the shaft is supported by a bracket (not shown) projecting from the right hand side of the auxiliary frame 389. The other arms 386 are fast to corresponding sleeves 390 surrounding the shaft 388. As the 5¢ key is farther away from the shaft 388 than are the other keys its link 393 loosely mounted on the rod 195. The arm 393 at its rear end is bifurcated and a pin or roller 394, projecting from the arm 386 fast to the outermost sleeve 390, works in this notch. Each sleeve 390 and the shaft 388, as shown in Figs. 6 and 7 of the drawings, are equipped with nearly circular disks 395 having cam projections 396, 397 and 398. The cam projections 396 are normally in engagement with studs 399 projecting laterally from the upwardly extending arms 401 of the tri-pronged members 400. There is one of these members 400 for each cam disk 396 and they are loosely mounted on a rod 402 supported by the central frame 42 in the machine and the auxiliary frame 389, and are properly spaced from one another by collars 405 on the shaft. Studs 403 (Fig. 6) on the rearwardly extending arms 404 of the tri-pronged members 400 are normally in engagement with periphery of their cam disks 395 between the cam portions 397 and 398.

When an amount key is depressed the corresponding sleeve 390 or the shaft 388 is rocked through the link 385 and arm 386 fast to the sleeve or shaft to turn the cam disk 396 fast to the sleeve of the shaft. Of course, the 25¢ key and the "six for a quarter" key turn their shaft 388 and sleeve 390 respectively in a counter-clockwise direction as viewed in Figs. 3 and 7, and the other keys of the bank turn their sleeves and cam disks 395 in a clockwise direction. Movement of one of the disks 395 serves to take the projection 396 out of engagement with the stud 399 on the upwardly extending arm 401 and at the same time one of the cam projections 397 or 398 engages the stud 403 on the rearwardly extending arm 404 and cams the tri-pronged member 400 downward in a counter clockwise direction. When the 25¢ key or the "six for a quarter" key is operated the cam projections 398 of the corresponding cam disks 395, the disks being turned in a counter clockwise direction, engages the stud 403 and as the other cam disks 395 are turned in the reverse direction upon the depression of the other keys the cam projections 297 of the cam disks 395 for these keys engage the studs 403 of the corresponding tri-pronged members 400. When the depressed key is restored to its normal undepressed position by the spring 15 coiled about its shank after the selected counter is actuated, the links 385 are elevated with the keys and the cam disks 395 are thereby turned back to normal position. As the cam disks 395 are being restored the cam projections 397 or 398 pass out of engagement with the studs 403 on the arms 404 of the tri-pronged member 400 and at the same time the cam projections 396, by engaging the studs 399 on the arms 401 of the member 400, forces the member 400 back to normal position and the members 400 are held in this position until the next operation of the machine.

The shaft 452 and each of the sleeves 453 surrounding the shaft (Figs. 6 and 7) have rigidly mounted thereon gear wheels 459 and these gear wheels are the same size as the gear wheels 451. The gear wheels 459 are mounted on the right hand end of the shaft 452 and sleeves 453 and are between the central frame 42 of the machine and the auxiliary frame 389, as best shown in Fig. 1. Loosely mounted on the shaft 452 and sleeves 453 and beside the gears 459 are companion or idle gears 460. These companion gears 460 mesh with corresponding gear wheels 461, having the same number of teeth and all rigidly mounted on a shaft 462 supported in suitable bearings in the central frame 42 and in the auxiliary frame 389. At the left hand end of the shaft 462 and to the right of the auxiliary frame 389 is rigidly mounted a mutilated gear 463 (Figs. 6 and 7), a locking portion 464 of which engages the periphery 465 of a locking portion 466 of another mutilated gear wheel 467 which is loosely mounted on the drive shaft 100. The mutilated gear 463 is of the same diameter as the gear wheels 461 and is the same except that the mutilated gear has the locking portion 464 displacing about six teeth, and the locking portion of this gear can be best seen in Fig. 6. Upon rotation of the drive shaft 100 in a counter clockwise direction indicated by the arrow, the periphery of the locking portion 466 of the mutilated gear 467 slides out of contact with the locking portion 464 of the mutilated gear 463 and the teeth on the gear 467 engage the teeth on the gear 463. As both of these gears have the same number of teeth it is evident that upon each complete rotation of the gear 467 the gear 463 will also be given one complete rotation and near the end of such rotation the locking portions 466 and 467 of the gears will again be brought into locking engagement.

To selectively connect one of the gears 459 rigid with the shaft 452 or the sleeves 453 with its companion gear 460, the rearwardly extending arm 404 of the tri-pronged member 400 (Figs. 6 and 7) carries a coupling pinion 470 which is as wide as the combined width of a pair of gears 459 and 460 so that when an amount key is operated, it will, through the links 385, arms 386, sleeves 390 and cam disks 395, rock its pronged member 400 counter clockwise, as already described, to lower the coupling pinion 470 carried by the pronged member into mesh with its corresponding pair of gears 459 and 460. The rearwardly and downwardly extending arms 471 of the tri-pronged members 400 carry pins 472 at their free ends and the pins normally engage between the teeth of the gear wheels 459 fast to the shaft 452 and sleeves 453 to prevent rotation of the sleeves and shaft when the pinions 470 are not in engagement with their respective pair of companion gears 459 and 460. When a pinion, however, is lowered into engagement with its pair of companion gears the pin 472 is carried out of contact with the teeth on the gear 459 to permit rotation of the sleeve 453 or the shaft 452 carrying the gear. When the coupling pinions 470 are in their normal position they engage a rod 470ª extending between the frame of the machine and the auxiliary frame 389, to properly aline the pinions.

By this construction it can be seen that when an amount key is operated, movement of its cam disk 395 through the link 385, arm 386 and sleeve 390 will lower the corresponding pinion 470 so that an idle gear 460, which is rotated at every operation of the machine may turn its companion pinion 459 and therefore the feeding roll or platen 434 and electro 433 of the ticket issuing device assigned to the key depressed, the gear on the platen being in mesh with the corresponding gear 451 mounted on the sleeve or shaft carrying the gear 459 turned through the coupling pinion 470.

*Ticket severing mechanism.*

The machine, as before stated, is equipped with severing means constructed partially to sever the tickets from one another when more than one ticket is to be issued at a single operation of the machine and to completely sever the last ticket issued from the ticket roll. The device for controlling the partial severance of the tickets from one another will be described later, but the knives and the means for actuating them when but one ticket is to be issued will be taken up now. As shown in Figs. 1 and 16 there are five movable knife edges 436, one for each ticket issuing device, and each of these knives 436 is designed to coöperate with a corresponding stationary knife edge 476. The knife edges for one of the printing mechanism are also shown in Fig. 14. All of the stationary knife edges 476 are formed in a plate or bar 473 rigidly mounted on the top of a frame 477, Figs. 1, 5 and 14. It can be seen that the guides 435 for the ticket strips pass up between the central vertical opening 481 formed between the two bars 478 of the frame 477 and Fig. 14 further shows these bars in cross section. The stationary knife edges 473 are inclined as shown in said figures so as to permit a partial severance between the tickets as will be later described. All of the movable knife edges 436 are carried in a frame consisting of a horizontal bar 484 extending over the stationary knife edges and integral at its ends with arms 485 which are fast to a shaft 486 which is loosely carried at the upper ends of two arms 487 which are rigidly mounted on a shaft 488 (Fig. 5). Loosely mounted on the shaft 488 on the right hand side of the arm 487 rigid with the left hand end of the shaft 488 (Fig. 8) is a bell crank lever 489, the outer end of the upwardly extending arm 490 of which is bifurcated to straddle the end of a shaft 491 which extends to the left of the arm 487, the shaft being carried by the arms 487 intermediate their ends. The other arm 492 of the bell crank lever 489 is pivoted at 493 to a pitman 494. The pitman 494 at its lower end is forked over the drive shaft 100 to permit reciprocation of the pitman. A cam groove 495 designed in the face of the disk 496 fast to the drive shaft 100 receives a roller 497 projecting laterally from the pitman 494. When the drive shaft 100 is turned upon an operation of the machine the pitman 494 is driven upward by the cam groove 495 and through the bell crank lever 489 throws the knife carrying frame rearward and while the knife frame is in this position the movable knives 436, being withdrawn from the opening in the guide 435, the printed ticket is fed between the movable knife edge and the stationary knife edge of its issuing device so that when the pitman 494 is restored to normal position the knife frame will be given a forward movement to sever the ticket fed between the knives.

The arms 485 of the knife carrying frames are equipped with rollers 498 (Figs. 1, 5 and 16) which work against the under surfaces of plates 500 fastened by screws 501 to the top of the central frame 42 to the left hand side frame of the machine. These rollers 498 and plates 500 are provided to guide the knife supporting bar 484 in its transverse movements and prevent the movable knife edges from being raised. Each movable knife is fastened to the horizontal bar 484 of the knife carrying frame by two pins 503 which loosely pass through holes in the bar 484. Plungers 504, which are seated in the bar 484 and provided with compression springs, are adjustable and merely rest on top of the movable knife edges to adjust the degree of pressure between the movable knife edges and the stationary knife edges.

As shown in Fig. 8, the shaft 491 connecting the two arms 487 of the movable knife carrying frame is provided at its left hand end with a knurled knob or button 508 and a spring 509 is coiled about the shaft between a collar 510 fast on the shaft and the left hand side arm 487. When a fresh or new ticket roll is being attached to the machine it is desirous to cut off the inserted end of the ticket roll as the edge is usually ragged, and to accomplish this the operator need only grasp the knob 508 and pull the shaft 491 to the left against the action of the spring 509. This carries the right hand end of the shaft 491 out of engagement with the bifurcated end of the arm 490 of the bell crank lever 489. The knife frame can then be manually swung with the shaft 488 without affecting the bell crank lever 489 and after the end of the ticket roll has been pushed up between the knife edges the operator restores the knife frame to normal position to sever the ragged end of the ticket roll and then releases his hold on the button or knob 508 to permit the spring 509 to restore the end of the shaft 491 into normal engagement with the bifurcated end of the arm 490 of the bell crank lever 489. To prevent the knife frame from being drawn backward too far an upwardly spring pressed plunger 512 projects upwardly from the middle of the rear bar 478 of the stationary knife carrying frame in which the plunger is mounted and hence is adapted to limit the extent of backward movement of the knife frame because the upper end of the plunger is in the path of movement of the horizontal bar 484 of the movable knife carrying frame. A plunger rather than a stationary stud is provided for assembling purposes only, as the plunger can be drawn downward to permit the assembling of the knife frame into place.

Ticket keys.

The ticket keys 2, as above stated, are mounted in the frame 4 similar to the amount key bank frame 3 and the ticket keys are constructed similarly to the amount keys. The first key 515 in the ticket bank is a release key for permitting the restoration of an operated ticket key to its initial outer position before an amount key is operated. As the amount keys serve to move the motor locking arm 97 out of engagement with the clutch connections for the motor to permit the motor to operate the machine, it is desirable to provide a temporary locking detent for temporarily retaining an operated ticket key in depressed position until the release key or an amount key is operated and also to provide another detent which is actuated by the amount keys to retain the operated ticket key in depressed position until near the end of the operation of the machine. The temporary locking detent 516 is shown in Fig. 13 in detail and this detent as well as the permanent locking detent 518 are shown assembled on the key frame 4 in Fig. 3. The temporary detent 516 is pivotally mounted on an arm 519 by a pin 520 and the arm at its lower end is pivoted at 521 to the key frame 4 and the rear end of the detent is connected at 523 to the upper end of a lever 524 pivoted at 526 to the frame 4. The pins 26 projecting from the left hand side of the shoulders 13 of the ticket keys normally engage the inclined shoulder of the projections 528 on detent 516. Depression of a ticket key thus causes the detent 516 to move forward about its pivots 521 and 526 until the pin 26 on the key passes beyond the inclined shoulder of its projection 528 on the detent, when a spring 530 connected at one end to a pin 531 projecting from the detent and at its other end to a pin 533 projecting from the key frame 4 draws the detent rearward. In this position of the detent the shoulder 528 passes over the pin 26 on the key and holds it in depressed position. The rearward movement of the temporary detent 516 is limited by the engagement of a shoulder 534 on the detent with a pin 535 on the key frame. If it is desired again to move the detent forward to release the operated ticket key, as, for example, when the wrong ticket key is operated, the release key 515 is operated before an amount key is operated. The pin 26 on the release key then engages a beveled edge 5 on the detent and moves the detent rearward sufficiently to carry the shoulder of the projection 528 away from the pin 26 on the depressed ticket key to permit the spring 15 coiled about the shank of the ticket key to restore the latter to normal position. In order to permit the restoration of the operated ticket key near the end of the operation of the machine after the proper number of tickets is issued, it is necessary to move the temporary locking detent 516 forward and this is done as each ticket is issued so that after the variable number of tickets has been issued the operated ticket key can be restored to undepressed position. The permanent locking detent 518 being employed to retain the operated ticket key in depressed position until after all of the tickets have been issued. The lower end of the lever 524 is in the path of movement of a roller 517 (Fig. 3) projecting laterally from the upwardly extending arm 135 of the lever 133. As the anti-friction roller 136 on the arm 135 passes upon every rotation of the shaft 100 from the portion 148 of its cam groove 137 to the portion 151 the arm 135 is drawn rearwardly far enough to effect forward movement of the temporary detent 516 so that the shoulder is carried away from the pin on the depressed key, in order to permit restoration of the operated key if the permanent detent 518 is moved out of locking position at the same time.

The detent 518 for retaining the operated keys in their depressed positions until near the end of the operation of the machine is slidably mounted on the right hand side of the key frame 4 on pins 539 and 541 projecting from the frame respectively entering a slot 540 in the rear end of the detent and a notch 542 at the forward end of the detent. This detent 518 is similar to the locking detent 68 for the amount bank in that the hook projections 94 upon the detent 518 are constructed similarly to those on the detent 68. When a ticket key is depressed and the detent 518 is moved rearwardly upon the operation of an amount key the hook projection 94 passes over the pin 25 of the ticket key and locks the key in depressed position. Movement of this detent 518 is effected by the amount keys as the lever 20 supporting the plate 17 which is moved rearward by the engagement of the pins 26 on the operated amount key with the notch 29 in the plate carries a pin 544 which passes into a notch 545 in the rear end of the detent 518. From this description it can be seen that the plate 17 and the key detent 518 are moved as a unit and therefore as the plate 17 is not restored to normal position until near the end of the operation of the machine the depressed ticket key will not be released until the same time.

*Mechanism controlling the variable operation of the machine.*

For the purpose of determining the number of tickets to be issued at a single operation of the main operating mechanism, the ticket bank of keys is provided with a movable plate 550 pivotally carried at its forward and rear ends respectively by the upwardly extending arms 551 and 552 of the levers 553 and 554 (Figs. 3 and 13). The levers 551 and 552 are mounted on the pins 521 and 526 to the right of the temporary locking detent 516. The pins 26 projecting from the left side of the ticket keys coöperate with the inclined notches 556 in the plate 550. These notches are inclined downwardly and forwardly with differential inclinations, however, and the lower ends of the notches are vertical. The downwardly extending arm 549 of the lever 553 as shown in Fig. 3 is normally raised out of the path of movement of a projection 548 of the pivoted yoke 294 which is rocked in the direction of the arrow by the amount keys through the lever 22 and plate 17. After an amount key is depressed a ticket key cannot be operated as the top of the projection 548 is then under the arm 549. The projection 548 is recessed at its forward edge to prevent engagement of the projection with an arm 549 after a ticket key is operated. The pin 26 on the release key 515 in the ticket bank is adapted to engage the forwardly and downwardly inclined edge 558 (Fig. 12) of a projection 559 under the key and on the plate 550 to move the plate 550 slightly rearward so that the pin 26 on the depressed ticket key will not be frictionally retained in depressed position by the rear side of the slot 556. A spring 560 connected to movable plate 550 at 561 and the key frame at 562 tends to retain the detent in normal position, and the shoulder 564 on the plate 550 engages the stud 535 on the key frame to prevent movement of the plate past normal position. The rearwardly extending arm 565 of lever 552 pivoted at 566 to a link 567 which, at its lower end, is pivoted at 568 to an arm 569 of the bell crank lever 64 which, as already stated, is loosely mounted on a shaft 40.

When a ticket key is operated it differentially moves the plate 550 rearwardly by the coöperation of the pin 26 on the key with the inclined edge 555 of the notch 556 under the pin and through the bell crank lever 554 and link 567 the bell crank lever 65 is always one step less than the number of tickets to be issued as the bell crank lever 65 is not moved from normal position when but one ticket is to be issued and in this position on the bell crank the first stop 62 on the stepped member 61 is one step of movement of the member 61 from the plate 63 carried by the arm 64 of the lever 65 as seen in Fig. 3. For example, when the two ticket key is depressed the bell crank lever 64 will be given but one step of movement and when the five ticket key is depressed it will receive four steps of movement.

After the proper ticket key is depressed an amount key is depressed, and as already described, the depression of an amount key through the movable plate 17, bell crank lever 19 supporting the plate, the link 31 and arm 48 rocks the member 38 about its pivot 40 to carry the lug 43 on the arm 44 of the member 38 out of engagement with the upper edge of the uppermost projection 45 on the rear end of the lever 46. If no ticket key is depressed the shaft 47 to which the lever 46 and locking arm 59 and stepped plate 61 are rigidly mounted will be given but one step of movement by the coiled spring 55 as the first stop 62 on the second stepped member 61 as already described engages the plate 63 on the bell crank lever 65 which has not been moved from normal position. With the bell crank lever 65 moved differentially out of normal position, however, by a ticket key the shaft 47 and the above mentioned members fast thereto will be given a number of steps of movement depending upon the extent of movement of the bell crank lever 65. Arcs swept from the points of the stops 62 with the shaft 47 as a center are distant from one another an extent equal to one step of movement of the plate 63 on the bell crank lever. If the bell crank lever 65 has been given one extent of movement by the two ticket key the shaft and the above mentioned members rigid thereon will be rocked by the spring 55 until the second step 62ª engages the differentially positioned plate 63 and if the bell crank lever 65 has been given four steps of movement by the five key the shaft and the above mentioned members will be given five extents of movement from normal position, the extent of movement in this case being limited by the engagement of the last stop 62ᶜ on the stepped member 61 with the plate 63. When the shaft 47 and arm 110 (Fig. 9) are rocked one, two or three steps, the roller 109 remains in engagement with the notch 108 in the link 105, and the motor controlling arm 97 is swung a corresponding distance. When the shaft 47 and arm 110 are rocked four or five steps of movement the roller 109 is carried out of engagement with the notch 108 at the beginning of the fourth step of movement, but the roller engages the forward inclined edge of the link 105 to retain the motor controlling arm 97 out of locking position.

As the lever 46 is rocked differentially with the shaft 47 the link 69 pivoted to the forward end of the lever will be lowered a like extent, the notch 71 in the link 69 being sufficiently long to permit the link to move five steps without becoming disengaged from the stud 72 on the bell crank lever 74 supporting the rear end of the locking detent 68 for the amount keys, and the locking detents 68 and 518 for the amount and ticket banks of keys are moved forward. On each rotation of the main drive shaft 100 the shaft 47, lever 46 and locking arm 59 are returned one step toward normal position in a manner to be presently described, by the mechanism described above and shown in Figs. 2 and 4. If the shaft 47 and arm 110 are rocked four or five steps the link 105 and arm 97 are not moved during the first or second return steps of movement of the arm 110. During the last three steps of return movement of the arm 110, however, the roller 109 engages with the notch 108 and the link 105 and arm 97 are then both moved step by step during the last three cycles of operation. The separate ticket issuing devices have been described as being adapted to issue one ticket at each rotation of the main drive shaft when the desired ticket issuing device is coupled to the operating mechanism so that the number of tickets issued at any operation of the machine will be the same as the number of rotations of the main drive shaft, the operated amount key being retained in the depressed positions described until the end of the operation of the machine so that the cam disk 395 which is operated by the depressed amount key retains the coupling bar 367 in engagement with the tie bar 375 which is operated by the main operating mechanism to actuate the individual ticket counter and also to retain the broad pinion 470 in mesh with the corresponding pair of companion gears 459 and 460 for driving the feeding mechanism of the ticket issuing device assigned to the key operated.

The operation of the mechanism for restoring the lever 46, motor locking arm 97 and the locking arm 59 step by step to normal position will be readily understood as the lever 46 and therefore these locking arms are moved one step back toward normal position in about the same manner that they are moved their one step to normal position when no ticket key is operated, this latter operation having been already described. To render the operation of this restoring mechanism more readily understood when more than one ticket is to be issued, it will be assumed that the three ticket key has been operated and that subsequently the motor is permitted to operate upon the depression of an amount key. The locking arm 97 for the motor and the locking arm 59 upon depression of the amount key are moved three steps from normal locking position with the lever 46 (Figs. 2 and 4) so that the fourth projection from the bottom on the front end of the lever 46 and indicated by the character "1274" will be almost in the same plane as the plane surface of the stud 125 on the upper end of the lever 124. During the first rotation of the main drive shaft 100 the bell crank lever 118 carrying the lever 124 and the lever 133 having the eccentric slot 130 engaged by the stud 129 on the lower end of the lever 124 are moved as a unit by their respective cam grooves 121 and 137 as explained above so that the plane surface of the stud 125 is nearly in the same plane as the lower face of the third projection 1273 from the bottom. The lever 133 is now given a movement by its cam 137 relative to the lever 118 so that the stud 125 on the lever 124 is carried under the third projection 1273 and subsequently the levers 118 and 133 are moved nearly as a unit to move the lever 46 and therefore the locking arm 59 and the motor locking arm 97 one step in a clockwise direction toward normal locking position. As the end of the first step of movement of the lever 46 is reached the stud 43 on the downwardly extending arm 44 of the multi-pronged member 38 is moved into engagement with the upper face of the third projection 45ᶜ from the top on the rear end of the lever 46 by the spring 51 and the engagement of the stud 154 (Fig. 2) with the inclined face 159 of the arm 157 forming one arm of the member 38, the upper end of the arm 48 having been cammed out of engagement with the stud 50 on the link 31 by the contact of the stud 154 with the face 155 of the arm 48. The stud 125 on the lever 124 is then carried out of engagement with the projection 1273 and upon the next rotation of the main drive shaft the lever 124 is lowered and moved as before by the lever 133 under the second projection 1272 from the bottom. The levers 118 and 133 are then raised as a unit to give the lever 46, locking arm 59 and motor locking arm 97 their second return step of movement. During this movement the member 38 is rocked counter clockwise as viewed in Fig. 2 by the engagement of the lower cam edge of the projection 45 with the curved surface of the stud 43 on the member and as the stud passed out of engagement with this cam edge, the stud is moved into engagement with the upper face of the projection 45$^b$ in the same manner that the stud was moved into engagement with the upper edge of the third projection 45$^c$. Upon the last rotation of the main drive shaft 100 the stud 125 is carried under the last projection 127 on the forward end of the lever 46 as described when but one ticket was issued and upon return movement of the levers 118 and 135 to raise the lever 124 carrying the stud 125 the lever 46 is moved to normal position and the locking arm 59 and the motor locking arm 97 being rigid with the lever lock the machine against further movement until an amount key is depressed at the next operation of the machine. During this last step of movement the lower cam edge of the projection 45 on the rear end of the lever 46 engages the curved surface of the stud 43 and cams the stud 43 outward and as the stud 43 passes the point of the projection it is restored to its normal engagement with the upper edge of the projection 45 by the spring 51 and engagement of the stud 154 with the arm 157 of the member 38.

The last increment of movement of the last step of movement of the lever 46 to normal position as when but one ticket is issued causes the lower end of the notch 71 in the link 69 to engage the pin 72 which is upon the bell crank lever 74 supporting the rear end of the amount key locking detent 68 and rocks the bell crank lever 74 counter clockwise, so that the detent 68 for the amount keys and the detent 518 for the ticket bank of keys and connected to the plate 117 are moved rearwardly to normal position to permit restoration of the depressed keys by their respective springs 15, the temporary detent 516 for the ticket keys being moved out of locking position at the same time by the engagement of the roller 517 on the lever 133 with the lever 524 supporting one end of the detent. The spring 560 upon restoration of the depressed keys to normal undepressed position restores the differentially movable plate 550 and the bell crank lever 65 connected thereto through the lever 554 and link 567 to normal position, in which position the plate 63 on the bell crank lever 65 is normally one step of movement from the first step 62 on the stepped member 61.

*Mechanism controlling the partial and complete severance of the tickets.*

As stated before, the severing mechanism for severing the tickets from the ticket rolls is adapted to partially sever the tickets from one another when more than one ticket is issued at a single operation of the machine and to wholly sever the last ticket fed through the opening 437 in the cabinet from the ticket roll. To this end the link 105 connecting the motor locking arm 97 and the arm 110 fast to the shaft 47 is provided with a slot 575 (Fig. 9) and the upper end 576 of the slot is inclined relative to the lower portion 577 of the slot. An arm 573 just within the right hand side frame of the machine and fast to a shaft 579 which is supported at its ends by the right hand side frame and the central frame 42 of the machine, carries a stud 580 at its upper end and the stud passes into the slot 575 and is normally in the upper portion of the latter. The stud 580 also passes through a slot 563 in the side frame 41 and the slot is concentric with the shaft 579 to permit oscillation of the arm 573. When but one ticket is issued the link 105 is raised one step as before described, and this one step of movement of the link is sufficient to rock the arm 573 clockwise as viewed in Fig. 10 so that the stud 580 is positioned at the angle between the upper portion 576 and the lower portion 577 of the slot 575. Further upward movement of the link 105 when more than one ticket is to be issued does not cause further movement of the arm 573, the lower portion 577 of the slot being constructed to have no effect on the arm. Fast to the other end of the shaft 579 and to the right of the central frame 42 is fast an arm 581 (Figs. 5 and 8) which is bifurcated at its upper end and straddles a pin 582 projecting laterally from the member 583 which surrounds the right hand end of the sleeve 584 which is shown in dotted lines in Fig. 8, and surrounds the shaft 488. The screw 586 connecting the radially projecting flanges 587 of the member 583 may be properly adjusted so that the member 583 is made rigid with the sleeve through frictional forces. The sleeve at its right hand end has an eccentric 588 upon which is loosely mounted the bell crank lever 489 which as heretofore described is actuated by the cam 495 (Fig. 5) through the medium of the pitman 494, to rock the knife carrying frame with the shaft 488. By turning the shaft 579 as the stud 580 (Fig. 9) passes from the upper end of the slot 575 to the angle between the lower and upper portions of the slot when but one ticket is to be issued the member 583, sleeve 584 and the eccentric 588 on the sleeve are turned in a clockwise direction as viewed in Fig. 5. In this manner the pivotal center of the bell crank lever 489 is so changed that the upper end of its arm 490 is not given its full extent of movement so that the movable knife carrying frame is first moved only far enough forward near the end of the rotation of the main drive shaft to permit the movable knife of the selected ticket issuing device to co-act with but part of the corresponding stationary knife to partially sever the issued ticket from the ticket strip, the cutting edges 482 of the stationary knives 473 being inclined for this purpose. As the stud 580 is in the lower portion 577 of the slot 575 when more than one ticket is to be issued the movable knives 436 will move as just described and the tickets are only partially severed from one another. When only one ticket is to be issued or the last ticket of a plurality of tickets is issued the knife frame is moved as before and only partially severs this ticket from the ticket roll, but when the link 105 is restored to normal position near the very end of the operation of the machine the knife frame is given an extra step of movement not by the cam 495 but through the turning of the eccentric 588 of the sleeve 584 to its normal position, so that the knives will co-act throughout their entire length and continue the severance of the last ticket or a single ticket from the ticket roll.

To prevent overthrow of the movable knife carrying frame due to any play between the parts just described the shaft 579 has fast thereto a nearly semi-circular member 590 the member being fast to the shaft so that the circular edge of the member is eccentric with the shaft. An arm 591 fast to the end of the shaft 488 to which the knife frame carrying arms 487 are fast normally engages the circular edge of the semicircular member 590. When the knife frame is moved rearward and then moved forward by the cam 495 the arm 591 contacts with the periphery of the member 490 and prevents excess movement of the movable knife frame. The semi-circular member 590 is fast to the shaft 579 so that it will turn fast with the shaft when the latter is moved by the link 105, so that the member will be engaged by the arm 591 when the knife frame is not given its full extent of forward movement to partially sever the tickets as well as when the knife frame is given its full extent of movement to completely sever a ticket from the ticket strip.

The motor does not of itself quite bring the operating parts back to home position and a well known device is provided to accomplish this end. A lever 593 (Fig. 2) is pivoted on a rod 594 and at its upper end carries an anti-friction roller 595. A highly tensioned spring 596 connected at one end to the lower end of the lever 593 and at the opposite end to a stud 597 extending from the central frame 42 keeps the roller 595 in engagement with the periphery of an open cam 598 fast to the shaft 381. The cam 598 is so constructed as to gradually extend the spring 596 until near the end of the rotation of the shaft 381 when the roller will engage the nearly radial edge 600 of the cam periphery and thereby permit the spring through the lever 593 to bring the operating parts completely home.

Operation.

The operation of the various mechanisms of the machine has been described in connection with the detailed description of the mechanisms and a brief description of the general operation of the machine is thought to be desirable and will now be given.

The operation of the machine will be described when it is operated to issue three 5¢ tickets. The operator first presses the "3" ticket key and as the pin 26 on the shoulder 13 of the key passes out of engagement with the shoulder (Figs. 3 and 13) of the projection 528 on the temporary locking detent 516 the spring 530 draws the detent forward about its pivots to lock the key in operated position. The depression of this key, through the engagement of the pin 26 on the key with the notch 556 under the pin and in the plate 550, moves the plate differentially rearward and through the lever 554 and link 567 gives the lever 65 two degrees or steps of rotary movement.

The 5¢ key is then depressed and the plate 17 is moved rearward by the engagement of the pin 26 on this key in the notch 29 in the plate and under the pin. The multi-armed member 38, through the lever 20, link 31 and arm 48, is thereby rocked counterclockwise (Fig. 2) and the stud 43 is carried out of engagement with the projection 45 on the rear end of the lever 46. The lever 46 and shaft 47 are rocked counter clockwise three steps by the spring 55 and their excursion of movement is limited by the engagement of the stop 62 on the stepped member 61 (Fig. 3) fast to the shaft 47 with the plate 63 on the differentially positioned lever 65. Such movement of the lever 46 lowers the link 69 (Fig. 4) to withdraw the end of the slot 71 in the upper end of the link away from the pin 72 on the bell crank lever 74 for the purpose of permitting the spring 82 to pull the amount key locking detent 68 forward to lock the operated key in depressed position. As the permanent locking detent 518 for the ticket keys is connected by the pin 544 to the lever 20 which supports one end of the plate 17 moved by the amount keys, this detent 518 moves with the plate 17 to lock the operated ticket key in depressed position until the amount key is released near the end of the operation of the machine. As the locking arm 59 is fast to the shaft 47 and the motor locking arm 97 is connected by the link 105 to the arm 110, which is also fast to the shaft 47, it is clear that these locking arms will be moved differentially with the shaft 47 to carry them out of locking position.

Depression of the 5¢ amount key, through the link 385 (Fig. 6) connected to the key, the arm 393, the arm 386 and the outermost sleeve 390, turns the cam disk 395 fast to the sleeve to carry the cam projection 396 on the disk out of engagement with the stud 399 on the arm 401 of the member 400 and the cam projection 397 engages the stud 403 on the arm 404 on this member and thereby rocks the member downward. The coupling pinion 470 on the arm 404 is lowered into mesh with the gear wheel 459 for the 5¢ ticket issuing device and its companion gear 460 to cause the pair of gears to rotate as a unit and thereby actuate the 5¢ ticket issuing device.

The mutilated gear 467 (Fig. 6) fast to the drive shaft 100 engages the mutilated gear 463 fast to the shaft 462 and rotates this latter shaft and the gear wheels 461. These gear wheels 461, there being one gear wheel for each ticket issuing device, constantly mesh with corresponding idle gear wheels 460 loose on the shaft 452 and sleeves 453 and so give the gear wheels 460 one complete rotation on each rotation of the main drive shaft. As the gear wheel 459 for the 5¢ ticket issuing device is coupled to its companion idle gear wheel 460 by the coupling pinion 470 the gears are rotated together and through the intermeshing gear wheels 451, 449 and 448 (Fig. 5) operate the 5¢ ticket issuing device, the platen 434 and the electro 433 respectively being rigid with the gear wheels 449 and 448. After a ticket is fed by the platen 434 and electro 433, the box cam 496, through the medium of the pitman 494 and the bell crank lever 489, moves the movable knife carrying frame 4 to partially sever the ticket strip between the first and second and second and third tickets and to wholly sever the third ticket from the strip.

Upon each rotation of the main drive shaft 100 the rock shaft 47 together with the locking arm 59, lever 46 and the stepped plate 61 fast to the shaft and the motor locking arm 97 connected to the shaft 47 by the link 105 and arm 110 are returned one step toward locking position. This operation is fully described above and it is thought unnecessary to repeat the same here. During the last step of movement of the lever 46 to normal position the locking detent 68 for the amount keys is moved rearward through the links 69 and lever 74 to permit restoration of the operated keys to normal position by their springs 15. As the plate 17 is connected to the ticket key detent 518 and moved to normal position by its spring 14 upon restoration of the amount keys, the ticket detent 518 is moved to normal unlocking position at about the same time the amount key detent is moved to normal position. Movement of the depressed amount key to its outer position carries its link 385 (Fig. 7) upward with it and thereby turns the operated cam disk 395 to normal position to cause the disengagement of the coupling pinion 470 from the companion gears 459 and 460 of the 5¢ ticket printer.

Finally, upon the amount and ticket keys being restored to undepressed position, the plate 17 is moved to normal position by its spring 14 and the spring 51 restores the upper shoulder 49 on the arm 48 to its normal position under the stud 50 on the link 31. The spring 560 restores the plate 550 to its initial position thereby again bringing the plate 63 on the lever 65 into contact with the stepped plate 61 above the first step 62 on the stepped plate.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination with a plurality of ticket rolls; of means for selectively printing thereon a varying number of tickets at a single operation of the machine; and a single severing means for partially severing the ticket roll between the tickets and wholly severing the last ticket from the selected roll.

2. In a machine of the class described, the combination with a main operating mechanism; of means for taking a plurality of similar impressions upon a ticket strip; an arm having an eccentric pivot and actuated by said operating mechanism; a knife carried by said arm to partially and wholly sever said ticket strip, the eccentricity of the pivot of said arm being adjusted by the main operating mechanism so that the ticket strip is partially severed between impressions and wholly severed after the last impression.

3. In a machine of the class described, the combination with a main operating mechanism; of means for taking a varying number of similar impressions upon a ticket strip at a single operation of the machine; an arm having an eccentric pivot and actuated by said operating mechanism; and a knife carried by said arm to partially and wholly sever the ticket strip, the eccentricity of said arm being changed to partially sever the ticket strip between impressions and wholly sever the same beyond the last impression.

4. In a machine of the class described, the combination with a main operating mechanism; of means for taking a plurality of similar impressions upon a ticket strip; an arm having an eccentric pivot and actuated by said operating mechanism; a knife carried by said arm, the eccentricity of the pivot of said arm being adjusted by the main operating mechanism so that the ticket strip is partially severed between impressions and wholly severed after the last impression; and a member moved by said operating mechanism to different extents and into the path of movement of said arm to positively limit the extent of movement of said knife at each actuation thereof.

5. In a machine of the class described, the combination with means holding a strip of ticket paper, of means for printing on said paper a varying number of tickets at a single operation of the machine, manipulative devices operable to determine the number of tickets to be printed at an operation, and means also controlled by the manipulative devices for partially severing the tickets one from another and completely severing the last ticket from the strip.

6. In a machine of the class described, the combination with means holding a roll of ticket strip, of means for printing on said strip a varying number of tickets at a single operation of the machine, manipulative devices operable to determine the number of tickets to be printed at an operation, a knife, and means also controlled by the manipulative devices whereby a variable movement may be imparted to the knife to partially sever the strip between the tickets and completely sever the last ticket from the strip.

7. In a machine of the class described, the combination with a pair of knives, of means for printing upon a ticket strip a variable number of tickets, means for variably operating the knives to partially sever the tickets one from the other and completely sever the last ticket from the strip, manipulative devices, and connections whereby the manipulative devices control the variable operation of the knives.

8. In a machine of the class described, the combination with means for printing upon a ticket strip a variable number of tickets, of a pair of knives, the edge of one knife acting at an angle to the edge of the other knife to shear a ticket strip, of means for variably operating the knives to partially shear certain tickets and completely shear other tickets, and manipulative devices controlling said means.

9. In a machine of the class described, the combination with mechanism for printing one at a time on a ticket strip a variable number of tickets at an operation, of a knife for partially severing the tickets one from another and completely severing the last ticket printed from the ticket strip, manipulative devices for determining the number of tickets to be printed, and connections whereby said devices also control the operation of the knife.

10. In a machine of the class described, the combination with mechanism for printing one at a time on a ticket strip a variable number of tickets, of a knife variably movable to partially sever tickets from the strip or completely sever the last ticket from said strip, means for alternately operating the printing mechanism to print a ticket and the knife to partially sever the tickets from the strip and completely sever the last ticket from said strip, and a series of keys operable to determine the number of tickets to be printed and controlling the operation of the knife.

11. In a ticket machine, the combination with means for printing upon a ticket strip a variable number of tickets, of a knife variably movable either to partially sever a ticket strip or to completely sever said strip, of a control shaft, manipulative devices, means for rotating the control shaft in one direction to extents determined by the manipulative devices, means for restoring said control shaft a step toward normal at each operation of the knife, and connections whereby the control shaft controls the variable movement of the knife.

12. In a ticket machine, the combination with means for printing upon a ticket strip a variable number of tickets, of a knife variably operable to partially sever certain tickets from a strip or to completely sever the last ticket of a series from the strip, a control shaft, manipulative devices, means for rotating the control shaft in one direction to extents determined by the manipulative devices, operating means for restoring said control shaft a step toward normal at each operation of the knife, and means controlled by the control shaft for limiting movement of said knife.

13. In a ticket machine, the combination with means for printing upon a ticket strip a variable number of tickets, of a knife variably operable to partially sever a ticket strip or to completely sever said strip, a control shaft, a series of keys, means for rotating the control shaft in one direction to extents determined by the keys, operating mechanism for restoring said control shaft a step toward normal at each operation of the knife, and connections whereby the control shaft controls the variable movements of the knife.

14. In a ticket machine, the combination with means for printing upon a ticket strip a variable number of tickets, of a knife variably movable either to partially sever tickets from a strip or to completely sever tickets from said strip, a control shaft, a series of keys, a spring for rotating the control shaft in one direction to extents determined by operating the keys, means for restoring said control shaft a step toward normal at each operation of the knife, and means controlled by the control shaft for limiting severing movement of the knife.

15. In a ticket machine, the combination with means for printing upon a ticket strip a variable number of tickets, of a pair of knives for severing a ticket strip, one of the knives being movable relative to the other and its edge coöperating at an angle with the edge of the other knife, means for variably operating the movable knife whereby to partially shear a ticket from the strip or to completely shear a ticket from the strip, a control shaft, a series of keys, means for differentially adjusting the control shaft under the control of the keys, means for restoring the control shaft a step toward normal at each operation of the machine, and means operatively connected to the control shaft for limiting the shearing movement of the movable knife.

In testimony whereof I affix my signature.

FRANCESCO SKERL.